(12) United States Patent
Boyer et al.

(10) Patent No.: US 11,777,976 B2
(45) Date of Patent: Oct. 3, 2023

(54) INFORMATION TECHNOLOGY SECURITY ASSESSMENT SYSTEM

(71) Applicant: BitSight Technologies, Inc., Boston, MA (US)

(72) Inventors: Stephen Wayne Boyer, Waltham, MA (US); Nagarjuna Venna, Waltham, MA (US); Megumi Ando, Cambridge, MA (US)

(73) Assignee: BitSight Technologies, Inc., Boston, MA (US)

( * ) Notice: Subject to any disclaimer, the term of this patent is extended or adjusted under 35 U.S.C. 154(b) by 235 days.

(21) Appl. No.: 17/069,151

(22) Filed: Oct. 13, 2020

(65) Prior Publication Data

US 2021/0211454 A1  Jul. 8, 2021

Related U.S. Application Data

(63) Continuation of application No. 13/240,572, filed on Sep. 22, 2011, now Pat. No. 10,805,331.

(60) Provisional application No. 61/492,287, filed on Jun. 1, 2011, provisional application No. 61/386,156, filed on Sep. 24, 2010.

(51) Int. Cl.
*H04L 9/40* (2022.01)
*G06Q 10/0639* (2023.01)
*H04L 61/5007* (2022.01)
*H04L 67/53* (2022.01)
*H04L 43/062* (2022.01)
*H04L 43/0876* (2022.01)

(52) U.S. Cl.
CPC ..... *H04L 63/1433* (2013.01); *G06Q 10/0639* (2013.01); *H04L 43/062* (2013.01); *H04L 43/0876* (2013.01); *H04L 61/5007* (2022.05); *H04L 67/53* (2022.05); *H04L 63/145* (2013.01)

(58) Field of Classification Search
CPC .................................................. H04L 63/1433
See application file for complete search history.

(56) References Cited

U.S. PATENT DOCUMENTS

| 5,867,799 | A  | 2/1999 | Lang et al. |
| 6,016,475 | A  | 1/2000 | Miller et al. |
| 6,745,150 | B1 | 6/2004 | Breiman |
| 6,785,732 | B1 | 8/2004 | Bates et al. |

(Continued)

FOREIGN PATENT DOCUMENTS

| WO | WO-2017/142694 A1 | 1/2019 |
| WO | WO-2019/023045 A1 | 1/2019 |

OTHER PUBLICATIONS

U.S. Appl. No. 29/599,622, Computer Display With Security Ratings Graphical User Interface, filed Apr. 5, 2017.

(Continued)

*Primary Examiner* — Simon P Kanaan
(74) *Attorney, Agent, or Firm* — Goodwin Procter LLP

(57) ABSTRACT

A method and system for creating a composite security rating from security characterization data of a third party computer system. The security characterization data is derived from externally observable characteristics of the third party computer system. Advantageously, the composite security score has a relatively high likelihood of corresponding to an internal audit score despite use of externally observable security characteristics. Also, the method and system may include use of multiple security characterizations all solely derived from externally observable characteristics of the third party computer system.

16 Claims, 4 Drawing Sheets

(56) References Cited

U.S. PATENT DOCUMENTS

| | | |
|---|---|---|
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| D652,048 S | 1/2012 | Joseph |
| D667,022 S | 9/2012 | LoBosco et al. |
| 8,359,651 B1 | 1/2013 | Wu et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,584,233 B1 | 11/2013 | Yang et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,752,183 B1 | 6/2014 | Heiderich et al. |
| 8,775,402 B2 | 7/2014 | Baskerville et al. |
| 8,806,646 B1 | 8/2014 | Daswani et al. |
| 8,825,662 B1 | 9/2014 | Kingman et al. |
| 8,949,988 B2 | 2/2015 | Adams et al. |
| 8,966,639 B1 | 2/2015 | Roytman et al. |
| D730,918 S | 6/2015 | Park et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,420,049 B1 | 8/2016 | Talmor et al. |
| 9,424,333 B1 | 8/2016 | Bisignani et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| 9,736,019 B2 | 8/2017 | Hardison et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D809,989 S | 2/2018 | Lee et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| 10,796,260 B2 | 10/2020 | Brannon et al. |
| D903,693 S | 12/2020 | Li et al. |
| D905,712 S | 12/2020 | Li et al. |
| D908,139 S | 1/2021 | Hardy et al. |
| 10,896,394 B2 | 1/2021 | Brannon et al. |

(56) References Cited

U.S. PATENT DOCUMENTS

| | | |
|---|---|---|
| 10,909,488 B2 | 2/2021 | Hecht et al. |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,909 S | 7/2021 | Nasu et al. |
| 11,126,723 B2 | 9/2021 | Bagulho Monteiro Pereira |
| 11,379,773 B2 | 7/2022 | Vescio |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0234767 A1 | 10/2005 | Bolzman et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2008/0270458 A1 | 10/2008 | Gvelesiani |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1 | 5/2010 | Christiansen et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239300 A1 | 9/2011 | Klein et al. |
| 2011/0249002 A1 | 10/2011 | Duplessis et al. |
| 2011/0282997 A1 | 11/2011 | Prince et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0055386 A1 | 2/2013 | Kim et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0263270 A1 | 10/2013 | Cote et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |

(56) References Cited

U.S. PATENT DOCUMENTS

| | | |
|---|---|---|
| 2014/0006129 A1 | 1/2014 | Heath |
| 2014/0019196 A1 | 1/2014 | Wiggins et al. |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0119373 A1 | 4/2016 | Fausto et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0241560 A1 | 8/2016 | Reshadi et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0104783 A1 | 4/2017 | Vanunu et al. |
| 2017/0142148 A1 | 5/2017 | Bußer et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1 | 9/2019 | Geil et al. |
| 2019/0303574 A1 | 10/2019 | Lamay et al. |
| 2019/0362280 A1 | 11/2019 | Vescio |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0012794 A1 | 1/2020 | Saldanha et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0106798 A1 | 4/2020 | Lin |
| 2020/0125734 A1 | 4/2020 | Light et al. |
| 2020/0183655 A1 | 6/2020 | Barday et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |
| 2021/0064746 A1 | 3/2021 | Koide et al. |

OTHER PUBLICATIONS

U.S. Appl. No. 29/599,620, Computer Display With Security Ratings Graphical User Inteface, filed Apr. 5, 2017.

(56) References Cited

OTHER PUBLICATIONS

U.S. Appl. No. 16/015,686, Methods for Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using Userr Activity Data, filed Jan. 9, 2020.
U.S. Appl. No. 17/146,064, Methods for Mapping IP Addresses and Domains to Organizations Using User Activity Data, filing Jan. 11, 2021.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 17/179,630, Correlated Risk in Cybersecurity, filed Feb. 19, 2021.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 17/000,135, Systems and Methods for Remote Detection of Software Through Browser Webinjects, filed Aug. 21, 2020.
U.S. Appl. No. 15/954,921, Systems and Methods for External Detection of Misconfigured Systems, filed Apr. 17, 2018.
U.S. Appl. No. 17/014,495, Systems and Methods for External Detection of Misconfigured Systems, filed Sep. 8, 2020.
U.S. Appl. No. 16/549,764 Systems and Methods for Inferring Entity Relationships Via Network Communications of Users or User Devices, filed Aug. 23, 2019.
U.S. Appl. No. 16/787,650, Systems and Methods for Inferring Entity Relationships Via Network Communications of Users or User Devices, filed Feb. 11, 2020.
U.S. Appl. No. 16/583,991, Systems and Methods for Network Asset Discovery and Association thereof With Entities, filed Sep. 26, 2019.
U.S. Appl. No. 17/085,550, Systems and Methods for Network Asset Discovery and Association Thereof With Entities, filed Oct. 30, 2020.
U.S. Appl. No. 29/666,942, Computer Display With Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 16/922,672, Systems and Methods for Generating Security Improvement Plans for Entities, filed Jul. 7, 2020.
U.S. Appl. No. 17/307,577, Systems and Methods for Generating Security Improvement Plans for Entities, filed May 4, 2021.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 17/018,587, Systems and Methods for Assessing Cybersecurity State of Entities Based on Computer Network Characterization, filed Sep. 11, 2020.
U.S. Appl. No. 17/132,512, Systems and Methods for Rapidly Generating Security Ratings, filed Dec. 23, 2020.
U.S. Appl. No. 16/779,437, Systems and Methods for Rapidly Generating Security Ratings, filed Jan. 31, 2020.

U.S. Appl. No. 17/119,822 Systems and Methods for Cybersecurity Risk Mitigation and Management, filed Dec. 11, 2020.
U.S. Appl. No. 16/802,232, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.
U.S. Appl. No. 29/736,641, Computer Display With Peer Analytics Graphical User Interface, filed Jun. 2, 2020.
U.S. Appl. No. 17/039,675, Systems and Methods for Determining Asset Importance in Security Risk Management, filed Sep. 30, 2020.
U.S. Appl. No. 17/320,997, Systems and Methods for Determining Asset Importance in Security Risk Management, filed May 14, 2021.
U.S. Appl. No. 16/884,607 Systems and Methods for Managing Cybersecurity Alerts, filed May 27, 2020.
U.S. Appl. No. 17/236,594, Systems and Methods for Managing Cybersecurity Alerts, filed Apr. 21, 2021.
"About Neo4j," 1 page.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Maltego XL," accessed on the Internet at https://www.paterva.com/web7/buy/maltegoclients/maltego-xl.php, 5 pages.
"Master Security Criteria," Version 3.0, BITS Financial Services Security Laboratory, Oct. 2001, 47 pages.
"Mile 2 CPTE Maltego Demo," accessed on the internet at https://www.youtube.com/watch?v=o2oNKOUzP0U; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=_EhYezVO6EE; Dec. 21, 2012; 1 page.
"Palantir.com," accessed on the internet at http://www.palantir.com/; Dec. 2015; 2 pages.
"Percentile-Based Approach to Forecasting Workload Growth Proceedings of CMG'15 Performance and Capacity International Conference by the Computer Measurement Group. No. 2015 (Year:2015)."
"Plugging the Right Holes," Lab Notes, MIT Lincoln Library, Posted Jul. 2008, retrieved Sep. 14, 2010 from http://www.ll.miLedufpublicationsflabnotesfpluggingtherightho! . . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business Risk Team, 52 pages.
Application as filed, U.S. Appl. No. 13/240,572.

(56) References Cited

OTHER PUBLICATIONS

Artz, Michael Lyle, "NetSPA: A Network Security Planning Architecture," Massachusetts Institute of Technology, May 24, 2002, 97 pages.

Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).

Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).

Bhilare et al., "Protecting Intellectual Property and Sensitive Information in Academic Campuses from Trusted Insiders: Leveraging Active Directory", SIGUCC, Oct. 2009 (5 pages).

BitSight, "Cyber Security Myths Versus Reality: How Optimism Bias Contributes to Inaccurate Perceptions of Risk", Jun. 2015, Dimensional Research, pp. 1-9.

Borgatti, et al., "On Social Network Analysis in a Supply Chain Context," Journal of Supply Chain Management; 45(2): 5-22; Apr. 2009, 18 pages.

Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.

Browne, Niall, et al., "Shared Assessments Program AUP and SAS70 Frequently Asked Questions," BITS, 4 pages.

Buckshaw, Donald L., "Use of Decision Support Techniques for Information System Risk Management," submitted for publication in Wiley's Encyclopedia of Quantitative Risk Assessment in Jan. 2007, 11 pages.

Buehler, Kevin S., et al., "Running with risk," The McKinsey Quarterly, No. 4, 2003, pp. 40-49.

Camelo, "Botnet Cluster Identification," Sep. 2014, 90 pages.

Camelo, "Condenser: A Graph-based Approach for Detecting Botnets," AnubisNetworks R&D, Amadora, Portugal and Centria, Universidade Nova de Lisboa, Portugal (pp. 8) Oct. 31, 2014.

Carstens, et al., "Modeling Company Risk and Importance in Supply Graphs," European Semantic Web Conference 2017: The Semantic Web pp. 18-31.

Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.

Chuvakin, "SIEM: Moving beyond compliance", RSA White Paper (2010) (16 pages).

Computer Network Graph-Bees, http://bioteams.com/2007/04/30/visualizing_complex_networks.html, date accessed Sep. 28, 2016, 2 pages.

Computer Network Graph—Univ. of Michigan, http://people.cst.cmich.edu/liao1q/research.shtml, date accessed Sep. 28, 2016, 5 pages.

Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.

Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.

Dillon-Merrill, PhD., Robin L, et al., "Logic Trees: Fault, Success, Attack, Event, Probability, and Decision Trees," Wiley Handbook of Science and Technology for Homeland Security, 13 pages.

Dun & Bradstreet Corp. Stock Report, Standard & Poor's, Jun. 6, 2009, 8 pages.

Dun & Bradstreet, The DUNSRight Quality Process: Power Behind Quality Information, 24 pages.

Edmonds, Robert, "ISC Passive DNS Architecture", Internet Systems Consortium, Inc., Mar. 2012, 18 pages.

Equifax Inc. Stock Report, Standard & Poor's, Jun. 6, 2009, 8 pages.

Gephi (gephi.org), accessed on the internet at https://web.archive.org/web/20151216223216/https://gephi.org/; Dec. 16, 2015; 1 page.

Gilgur, et al., "Percentile-Based Approach to Forecasting Workload Growth" Proceedings of CMG'15 Performance and Capacity International Conference by the Computer Measurement Group. No. 2015 (Year:2015), 16 pages.

Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.

Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796. 8 pages.

Hacking Exposed 6, S. McClure et al., copyright 2009, 37 pages.

Ingols, Kyle, et al., "Modeling Modern Network Attacks and Countermeasures Using Attack Graphs," MIT Lincoln Laboratory, 16 pages.

Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.

Ingols, Kyle, et al., "Practical Experiences Using SCAP to Aggregate CND Data," MIT Lincoln Library, Presentation to NIST SCAP Conference, Sep. 24, 2008, 59 pages.

Jean, "Cyber Security: How to use graphs to do an attack analysis," accessed on the internet at https://linkurio.us/blog/cyber-security-use-graphs-attack-analysis/; Aug. 2014, 11 pages.

Jin et al, "Identifying and tracking suspicious activities through IP gray space analysis", MineNet, Jun. 12, 2007 (6 pages).

Johnson, Eric, et al., "Information Risk and the Evolution of the Security Rating Industry," Mar. 24, 2009, 27 pages.

Joslyn, et al., "Massive Scale Cyber Traffic Analysis: A Driver for Graph Database Research," Proceedings of the First International Workshop on Graph Data Management Experience and Systems (GRADES 2013), 6 pages.

KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.

Li et al., "Finding the Linchpins of the Dark Web: a Study on Topologically Dedicated Hosts on Malicious Web Infrastructures", IEEE, 2013 (15 pages).

Lippmann, Rich, et al., NetSPA: a Network Security Planning Architecture, MIT Lincoln Laboratory, 11 pages.

Lippmann, Richard, et al., "Validating and Restoring Defense in Depth Using Attack Graphs," MIT Lincoln Laboratory, 10 pages.

Lippmann, RP., et al., "An Annotated Review of Papers on Attack Graphs," Project Report IA-1, Lincoln Laboratory, Massachusetts Institute of Technology, Mar. 31, 2005, 39 pages.

Lippmann, RP., et al., "Evaluating and Strengthening Enterprise Network Security Using Attack Graphs," Project Report IA-2, MIT Lincoln Laboratory, Oct. 5, 2005, 96 pages.

Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber=1258471 (Year: 2003).

Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.

MaxMind, https://www.maxmind.com/en/about-maxmind, https://www.maxmind.com/en/geoip2-isp-database, date accessed Sep. 28, 20116, 3 pages.

Mcnab, "Network Security Assessment," copyright 2004, 13 pages.

Mcnab, "Network Security Assessment," copyright 2004, 56 pages.

Method Documentation, CNSS Risk Assessment Tool Version 1.1, Mar. 31, 2009, 24 pages.

Mile 2 CPTE Maltego Demo, accessed on the internet at https://www.youtube.com/watch?v=o2oNKOUzPOU; Jul. 12, 2012; 1 page.

Moradi, et al., "Quantitative Models for Supply Chain Management," IGI Global, 2012, 29 pages.

(56) References Cited

OTHER PUBLICATIONS

Morningstar Direct, dated to Nov. 12, 202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The Mitre Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585.
U.S. Appl. No. 13/240,572 and pending claims.
U.S. Appl. No. 13/240,572, application as filed and pending claims.
U.S. Appl. No. 14/021,585 and pending claims.
U.S. Appl. No. 14/021,585 and application as filed.
U.S. Appl. No. 14/944,484 and pending claims.
U.S. Appl. No. 61/386,156.
Application as filed and pending claims for U.S. Appl. No. 13/240,572.
Application as filed and pending claims for U.S. Appl. No. 14/944,484.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost in the Browser Analysis of Web-based Malware", 2007 (9 pages).
Rare Events, Oct. 2009, Jason, The Mitre Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=1013603, Apr. 28, 2010, 2 pages.
Search Query Report form IP.com (performed Apr. 27, 2020).
Security Warrior, Cyrus Peikari, Anton, Chapter 8: Reconnaissance, 6 pages.
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
U.S. Appl. No. 15/271,655, Published as: US2018/0083999, Self-Published Security Risk Management, filed Sep. 21, 2016.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121 Published as: US2019/0260791, Methods for Using Organizational Behavior for Risk Ratings, filed May 7, 2019.
U.S. Appl. No. 17/025,930 Published as US2021/0006581, Methods for Using Organizational Behavior for Risk Ratings, filed Sep. 18, 2020.
U.S. Appl. No. 13/240,572 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.
U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 D835,631, Computer Display Screen With Graphical User Interface, filed Mar. 24, 2017.
U.S. Appl. No. 29/598,299 D818,475, Computer Display With Security Ratings Graphical User Interface, filed Mar. 24, 2017.
U.S. Appl. No. 29/599,622 D847,169, Computer Display With Security Ratings Graphical User Interface, filed Apr. 5, 2017.
U.S. Appl. No. 29/599,620 D846,562, Computer Display With Security Ratings Graphical User Interface, filed Apr. 5, 2017.
U.S. Appl. No. 16/015,686 U.S. Pat. No. 10,425,380, Methods for Mapping IP Addresses and Domains to Organizations Using User Activity Data, filed Jun. 22, 2018.

(56) References Cited

OTHER PUBLICATIONS

U.S. Appl. No. 16/543,075 U.S. Pat. No. 10,554,619, Methods for Mapping IP Addresses and Domains to Organizations Using User Activity Data, filed Aug. 16, 2019.
U.S. Appl. No. 16/738,825 U.S. Pat. No. 10,893,021, Methods for Mapping IP Addresses and Domains to Organizations Using User Activity Data, filed Jan. 9, 2020.
U.S. Appl. No. 17/146,064 Published as: US2021/0218702, Methods for Mapping IP Addresses and Domains to Organizations Using User Activity Data, filed Jan. 11, 2021.
U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723, Correlated Risk in Cybersecurity, filed Mar. 5, 2019.
U.S. Appl. No. 16/795,056 U.S. Pat. No. 10,931,705, Correlated Risk in Cybersecurity, filed Feb. 19, 2020.
U.S. Appl. No. 17/179,630 Published as US2021/0176269, Correlated Risk in Cybersecurity, filed Feb. 19, 2021.
U.S. Appl. No. 16/170,680 U.S. Pat. No. 10,521,583, Systems and Methods for Remote Detection of Software Through Browser Webinjects, filed Oct. 25, 2018.
U.S. Appl. No. 16/688,647 U.S. Pat. No. 10,776,483, Systems and Methods for Remote Detection of Software Through Browser Webinjects, filed Nov. 19, 2019.
U.S. Appl. No. 17/000,135 U.S. Pat. No. 11,126,723, Systems and Methods for Remote Detection of Software Through Browser Webinjects, filed Aug. 21, 2020.
U.S. Appl. No. 17/401,683 Published as US2021/0374243, Systems and Methods for Remote Detection of Software Through Browser Webinjects, filed Aug. 13, 2021.
U.S. Appl. No. 15/954,921 U.S. Pat. No. 10,812,520, Systems and Methods for External Detection of Misconfigured Systems, filed Apr. 17, 2018.
U.S. Appl. No. 17/014,495 Published as: US2020/0404017, Systems and Methods for External Detection of Misconfigured Systems, filed Sep. 8, 2020.
U.S. Appl. No. 16/549,764 Published as: US2021/0058421, Systems and Methods for Inferring Entity Relationships Via Network Communications of Users or User Devices, filed Aug. 23, 2019.
U.S. Appl. No. 16/787,650 U.S. Pat. No. 10,749,893, Systems and Methods for Inferring Entity Relationships Via Network Communications of Users or User Devices, filed Feb. 11, 2020.
U.S. Appl. No. 16/583,991 U.S. Pat. No. 10,848,382, Systems and Methods for Network Asset Discovery and Association Thereof With Entities, filed Sep. 26, 2019.
U.S. Appl. No. 17/085,550 U.S. Pat. No. 11,329,878 Published as: US2021/0099347, Systems and Methods for Network Asset Discovery and Association Thereof With Entities, filed Oct. 30, 2020.
U.S. Appl. No. 29/666,942 D892,135, Computer Display With Graphical User Interface, filed Oct. 17, 2018.
U.S. Appl. No. 16/360,641 U.S. Pat. No. 11,200,323, Systems and Methods for Forecasting Cybersecurity Ratings Based on Event-Rate Scenarios, filed Mar. 21, 2019.
U.S. Appl. No. 17/523,166 Published as US2022/0121753, Systems and Methods for Forecasting Cybersecurity Ratings Based on Event-Rate Scenarios, filed Nov. 10, 2021.
U.S. Appl. No. 16/514,771 U.S. Pat. No. 10,726,136, Systems and Methods for Generating Security Improvement Plans for Entities, filed Jul. 17, 2019.
U.S. Appl. No. 16/922,673 U.S. Pat. No. 11,030,325, Systems and Methods for Generating Security Improvement Plans for Entities, filed Jul. 7, 2020.
U.S. Appl. No. 17/307,577 Published as: US2021/0211454, Systems and Methods for Generating Security Improvement Plans for Entities, filed May 4, 2021.
U.S. Appl. No. 29/677,306 D905,702, Computer Display Screen With Corporate Hierarchy Graphical User Interface, filed Jan. 18, 2019.
U.S. Appl. No. 16/775,840 U.S. Pat. No. 10,791,140, Systems and Methods for Assessing Cybersecurity State of Entities Based on Computer Network Characterization, filed Jan. 29, 2020.
U.S. Appl. No. 17/018,587 U.S. Pat. No. 11,050,779, Systems and Methods for Assessing Cybersecurity State of Entities Based on Computer Network Characterization, filed Sep. 11, 2020.
U.S. Appl. No. 16/779,437 U.S. Pat. No. 10,893,067 Published as: US2021/0243221, Systems and Methods for Rapidly Generating Security Ratings, filed Jan. 31, 2020.
U.S. Appl. No. 17/132,512 Published as US2021/0243221, Systems and Methods for Rapidly Generating Security Ratings, filed Dec. 23, 2020.
U.S. Appl. No. 17/119,822 U.S. Pat. No. 11,122,073, Systems and Methods for Cybersecurity Risk Mitigation and Management, filed Dec. 11, 2020.
U.S. Appl. No. 29/815,855, Computer Display With a Graphical User Interface for Cybersecurity Risk Management, filed Nov. 17, 2021.
U.S. Appl. No. 17/392,521 Published as US2022/0191232, Systems and Methods for Cybersecurity Risk Mitigation and Management, filed Aug. 3, 2021.
U.S. Appl. No. 16/802,232 U.S. Pat. No. 10,764,298, Systems and Methods for Improving a Security Profile of an Entity Based on Peer Security Profiles, filed Feb. 26, 2020.
U.S. Appl. No. 16/942,452 U.S. Pat. No. 11,265,330, Systems and Methods for Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641 D937,870, Computer Display With Peer Analytics Graphical User Interface, filed Jun. 2, 2020.
U.S. Appl. No. 17/039,675 U.S. Pat. No. 11,032,244 Published as US2021/0099428, Systems and Methods for Determining Asset Importance in Security Risk Management, filed Sep. 30, 2020.
U.S. Appl. No. 17/320,997 Published as US2021/0344647, Systems and Methods for Determining Asset Importance in Security Risk Management, filed May 14, 2021.
U.S. Appl. No. 16/884,607 U.S. Pat. No. 11,023,585, Systems and Methods for Managing Cybersecurity Alerts, filed May 27, 2020.
U.S. Appl. No. 17/236,594 Published as US2021/0374246, Systems and Methods for Managing Cybersecurity Alerts, filed Apr. 21, 2021.
U.S. Appl. No. 17/710,168, Systems and Methods for Assessing Cybersecurity Risk in a Work From Home Environment, filed Mar. 31, 2022.
U.S. Appl. No. 17/945,337, Systems and Methods for Precomputation of Digital Asset Inventories, filed Sep. 15, 2022.
U.S. Appl. No. 17/856,217, Systems and Methods for Accelerating Cybersecurity Assessments, filed Jul. 1, 2022.
Search Query Report from IP.com (performed Jul. 29, 2022).

INFORMATION TECHNOLOGY SECURITY ASSESSMENT SYSTEM

CROSS-REFERENCE TO RELATED APPLICATIONS

The present application is a continuation of U.S. patent application Ser. No. 13/240,572 entitled "Information Technology Security Assessment System" and filed on Sep. 22, 2011, which claims priority to U.S. Prov. Pat. App. No. 61/386,156 entitled "Enterprise Information Security Score" and filed on Sep. 24, 2010; and 61/492,287 entitled "Information Technology Security Assessment System" and filed on Jun. 1, 2011 which are hereby incorporated herein in their entireties by reference.

ACKNOWLEDGEMENT

This invention was made with government support under 1127185 awarded by the National Science Foundation. The government has certain rights to this invention.

BACKGROUND

The present invention relates to systems for determining the security of information systems and, in particular, for evaluating the security of third-party computer systems.

When a company wants to reduce its cyber security risk of doing business with another company's computer systems, it either performs, or hires an outside firm to perform, a cyber security assessment of the other company to determine if it is following good security practices. The theory is that these good practices make it difficult for attackers to compromise the networks of the other company. If the auditing company is satisfied with the assessment, it may choose to continue doing business with the other company. Or, it may ask the other company to make some improvements to its security systems or terminate the business relationship.

Generally, these audits are slow, expensive and impractical given the high volume of service provider security systems that need to be characterized by the company. And, the inventors have noted that audits are not entirely predictive of the performance of the security systems.

SUMMARY

A method and system is disclosed for creating a composite security rating from security characterization data of a third party computer system. The security characterization data is derived from externally observable characteristics of the third party computer system. Advantageously, the composite security rating has a relatively high likelihood of corresponding to an internal audit score despite use of externally observable security characteristics. Also, the method and system may include use of multiple security characterizations all solely derived from externally observable characteristics of the third party computer system.

A method of evaluating information security of a third party computer system is disclosed. The method includes collecting at least two security characterizations of the third party computer system. A composite security rating is generated using the at least two security characterizations. Advantageously, the two security characterizations are derived from externally observable characteristics of the third party system.

Each of the security characterizations may be from an associated one of a plurality of independent entities. For example, the independent entities may include commercial data sources. Also, the security characterizations may be derived without permission of the third party system.

The security characterizations may include multiple data types, such as breach disclosures, block lists, configuration parameters, malware servers, reputation metrics, suspicious activity, spyware, white lists, compromised hosts, malicious activity, spam activity, vulnerable hosts, phishing, user-behavior or e-mail viruses. The externally observable characteristics may also include serving of malicious code or communications with known attacker controlled networks.

The externally observable characteristics may be evidence of internal security controls or outcomes or operational execution of security measures of the third party computer system.

The collecting and generating steps may be repeated to generate a series of scores and the series examined to determine a trend. Also, the scores may be reported to a consumer. For instance, reporting may include reporting a warning based on a change in the scores. Or, reporting may include posting the score and warning to a web portal.

Collecting the security characterizations may include using various tools such as WGET, RSYNC, CURL or interfaces that may be characterization specific.

The method may also include mapping the third party computer system to an IP space and using the IP space for collecting the security characterizations. Mapping, for example, may include querying a Regional Internet Registry (RIR), such as by submitting an entity name to the RIR. Querying an entity name may include querying for variations of the entity name.

Mapping may also include using a domain name associated with the third party computer system. For example, tools such as nslookup or dig may be used on the domain name to determine a published IP address. Mapping may also include probing addresses around the published IP address. For example, IP addresses could be probed in powers of two around the published IP address. Mapping could also include adapting the domain name to server naming conventions and using tools like nslookup to verify an IP address associated with the domain name.

Generating the composite security rating may include assessing vulnerability and resilience of the third party computer systems. Vulnerability, for example, may include a number of IP addresses with malicious behavior. Resilience may be inversely proportional to a duration of malicious behavior.

The IP space may include a plurality of IP addresses. And, the composite security rating may correspond to an intensity and duration of malicious activity determined from one of the security characterizations. Generation of the composite security rating may include aggregation of a plurality of individual security metrics and/or the IP addresses associated with the third party computer system.

Determination of the individual security metric may include adjusting for false positives in the security characterizations. Correlating data across multiple related security characterizations may help improve the quality of any single security characterization. Further, adjusting for false positives may include determining an occurrence of an event, which includes persistent, reported activity on one of the IP addresses for a predetermined period of time. It may also include determining an intensity of the IP address for the predetermined period of time, such as a day.

Determining the intensity may include increasing intensity in proportion to a number of reporting targets from the security characterizations.

Determining an individual security metric may include assigning a raw score for each of the IP addresses appearing on a block list as one of the security characterizations. After an IP address is delisted, the raw score may be exponentially attenuated.

The individual security metric may also incorporate a raw score in proportion to a CIDR block size.

Individual security metrics or the composite ratings may be normalized based on, for example, network size or a number of employees.

Security characterizations may also include positive information about an organization that's aggregated into the composite rating.

The method could also include statistically correlating the composite security rating with actual outcomes and adjusting the generating step based on the statistical correlations.

Further, the method may include determining a confidence range of the composite security rating. For example, the confidence range may be based on a redundancy of the security characterizations or a size of the third party computer system.

The method may also include determining an accuracy of each of the security characterizations, such as by determining a level of coverage of the third party computer system by the security characterizations.

Also disclosed herein are a system and computer program product for data collection and scoring, including systems and software for performing the methods described above.

Another method may include generating a composite security rating using at least one security characterization that's derived from externally observable characteristics of the third party computer system wherein the composite security rating has a relatively high likelihood of corresponding to an internal audit score.

DETAILED DESCRIPTION

Figure 1:
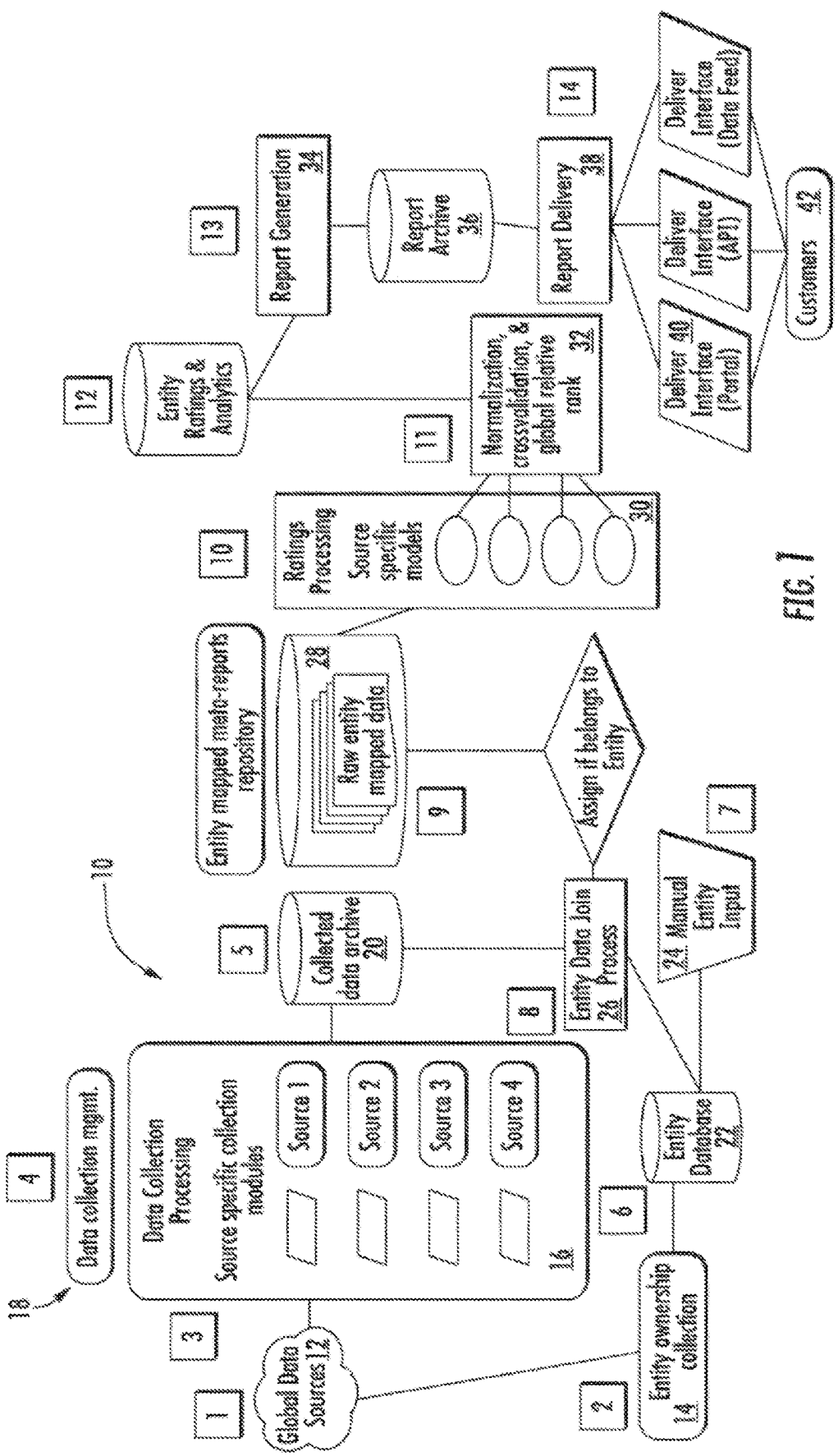
FIG. 1 is a schematic of a system for evaluating information security.

Generally, the present invention includes a method, system and computer program product for creating composite security ratings from security characterization data of a third party computer system. The security characterization data is derived from externally observable characteristics of the third party computer system. Advantageously, the composite security rating has a relatively high likelihood of corresponding to an internal audit score despite use of externally observable security characteristics. Also, the method and system may include use of multiple security characterizations all solely derived from externally observable characteristics of the third party computer system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 1, a system 10 for evaluating information security of a third party computer system includes the following systems: a global data source 12, an entity ownership collector 14, a data collection processor 16, a data collection management 18, a data archive 20, an entity database 22, a manual entity input 24, an entity data join process 26, an entity mapped meta-reports repository 28, a ratings processing 30, a normalization, consolidation and global relative rank 32, a report generation 34, a report archive 36 and a report delivery 38 systems. Different delivery modules 40 are configured to use different methods to deliver the reports to customers 42.

The global data source system 12 obtains data sources that characterize any observation about an entity (e.g., a third party computer system) and these sources can be highly varied and disparate. Each data source has a particular vantage point of the security related characteristics of entities.

The entity ownership collection system 14 gathers information about an entity. This includes information about which IT assets an entity owns, controls, uses, or is affiliated with. Examples of asset ownership include control and operation of an Internet Protocol (IP) network address range or computer services such as web servers residing within that address block. Information about entities also includes relationships such as subsidiaries, affiliates, etc., that describe entity association.

The data collection processing system 16 includes custom modules configured to collect and process unique data sources.

The data collection management system 18 is configured to schedule and coordinate the constant collection of the different data sources.

The data archive 20 is configured to store all of the terabytes of data constantly collected by the data collection management system 18.

The entity database 22 holds all of the information about an entity such as its name, address, web site address, industry sector, IP address ranges owned, etc. This data base includes the "Entity Map" which maps data back to an entity. For example, if observations are made about a particular IP address, the IP address can be looked up in the entity map to determine which entity controls or owns that address. This database is populated by automatic or manual data collection methods, or combinations thereof.

The manual entity input system is configured to place non-automatic data on an entity into the entity database 22.

The entity data join process or system 26 is configured to match the collected data to the entity. In most instances, this is a computationally expensive operation because it requires going though all of the data collected and performing the map operation. Any evidence of security outcomes or configurations in the larger data collection pool is then assigned to an entity based on the entity map.

The entity mapped meta-reports repository 28 contains data summaries of observations made with respect to a particular entity for each data set after the map/join process is complete.

The ratings processing system 30 may include custom models for applying data source specific ratings to determine an entity rating. Each data source generally requires a custom model due to the unique nature of that data source. Each model accounts for the custom attributes and idiosyncrasies of the different data sources that have been mapped to the entity being rated. Custom data source models can account for any data source feature including temporal and cross-data source behaviors.

The ratings normalization, cross-validation, and relative ranking system 32 is configured to normalize ratings so appropriate entity-to-entity comparisons can be made and the ratings are normalized and ranked within sectors or peer-groups and globally.

An entity and rating analytics repository or archive 36 is configured to hold all of the ratings data and resulting analytics produced by the ratings process.

A report generation system 34 takes the ratings and analytics and generates report objects. These objects are not rendered into any particular presentation format at this stage but are in a generic intermediary format that can be then transformed into a specific deliverable format.

A report delivery system 38 is configured to translate generic reports into a specific report format. Examples of these formats include HTML, PDF, text, and XML. Delivery modules 40 are different methods for delivering the reports include by web portal, API or data feed.

Advantages include ratings based on the quality of outcomes of the information security practices of the third party computer systems and enablement of comparisons of ratings across organizations. The system 10 can be entirely, or to a large extent, automated and need not have the permission of the entity being rated. The reports will allow risk management professionals to monitor, assess and mitigate partner risk by up-to-date ratings due to its persistent monitoring of the third party computer systems. Also, the portal may provide for location of new partners, such as suppliers, with lower risk profiles and improved security postures.

Unlike internal audit systems, the system 10 is not relying upon a correlation between practices and outcomes. Instead, evidence of actual security outcomes is collected through the data source partners.

Also advantageously, trial data on 50 entities revealed that rankings produced using the system 10 matched internal evaluations. In some cases the system 10 revealed problems with the entities not revealed by internal evaluations.

Data Sources

External ratings from data sources available outside an entity provide an information security based view into internal workings of the organization. For example, infection by malicious software can be determined using non-invasive website scanning technology. Communication between the entity computer system and known attacker controlled networks may reveal when the computer system has been compromised. Also, if an entity computer system is serving malicious code to visitors the system was compromised at some point. The entity may not have the capability to detect such compromises or cannot quickly react operationally to resolve the issue. External observations also can measure operational execution, which may not occur despite good internal policies.

A diverse set of network sensors and services around the Internet collect and observe information about the third party entity computer systems. The system 10 then gathers, processes, and stores the data collected about entities from the sensors and service providers using custom developed data source specific collection processors. The collection manager 18 automates the scheduling and execution of the different collectors.

The global data source system 12 includes hundreds of potential data sources, including, for example during experimental testing, 97 data sources owned by 37 organizations. At least 82 data sources are on active collection, being stored on the data archive 20. Trial ratings were performed on at least 11 data sources from 7 organizations. Rankings were produced on nearly 600 different entities.

A data source is a single type of data from a single organization. For example, if two organizations provide a list of hosts that participate in phishing attacks, they are counted as two data sources. The 15 types of data in Table 3 all provide different information security related views of an organization. New types of data and new sources of existing data types are constantly added to the data sources used to characterize the performance of the entity. Breach disclosures for example indicate that an organization has experienced a particular kind of data or integrity breach. Configuration data on the other hand provides any number of configuration related information and could for example state the type of encryption used on the organization's website.

TABLE 1

Data Sources Summary

| | |
|---|---|
| Total Data Sources | 97 |
| Total Sourcing Organizations | 37 |

TABLE 1-continued

Data Sources Summary

| | |
|---|---|
| Total Sources on Active Collection | 82 |
| Total Different Source Types | 15 |

TABLE 3

Data Source Types

| Breach Disclosures | Spam Activity |
|---|---|
| Block Lists | Vulnerable Hosts |
| Configuration Parameters | Spyware |
| Compromised Hosts | Whitelists |
| Malicious Activity | Email viruses |
| Malware Servers | Multi-type |
| Reputation | Phishing |
| Suspicious Activity | User Behavior |

Of the 97 data sources identified, 82 are on "Active Collection" meaning there is a method for obtaining the data source and that its collection is automated. The high degree of automation helps to satisfy the methodology objective for adoption of techniques that are principally automated.

Table 2 lists the 6 collections methods employed for data acquisition with the "Unknown" category meaning that the sources are identified but the method and ability to collect that data source has yet be determined. The method Instances are the number of data sources that are collected using that particular method. For example, 32 of the sources are collected using the network file transfer and synchronization tool rsync (http://samba.anu.edu.au/rsync/).

TABLE 2

Data Collection Methods

| Methods | Instances |
|---|---|
| WGET | 35 |
| RSYNC | 32 |
| API | 13 |
| MANUAL | 6 |
| WHOIS | 1 |
| HTTP GET | 1 |
| UNKNOWN | 9 |

Figure 2:
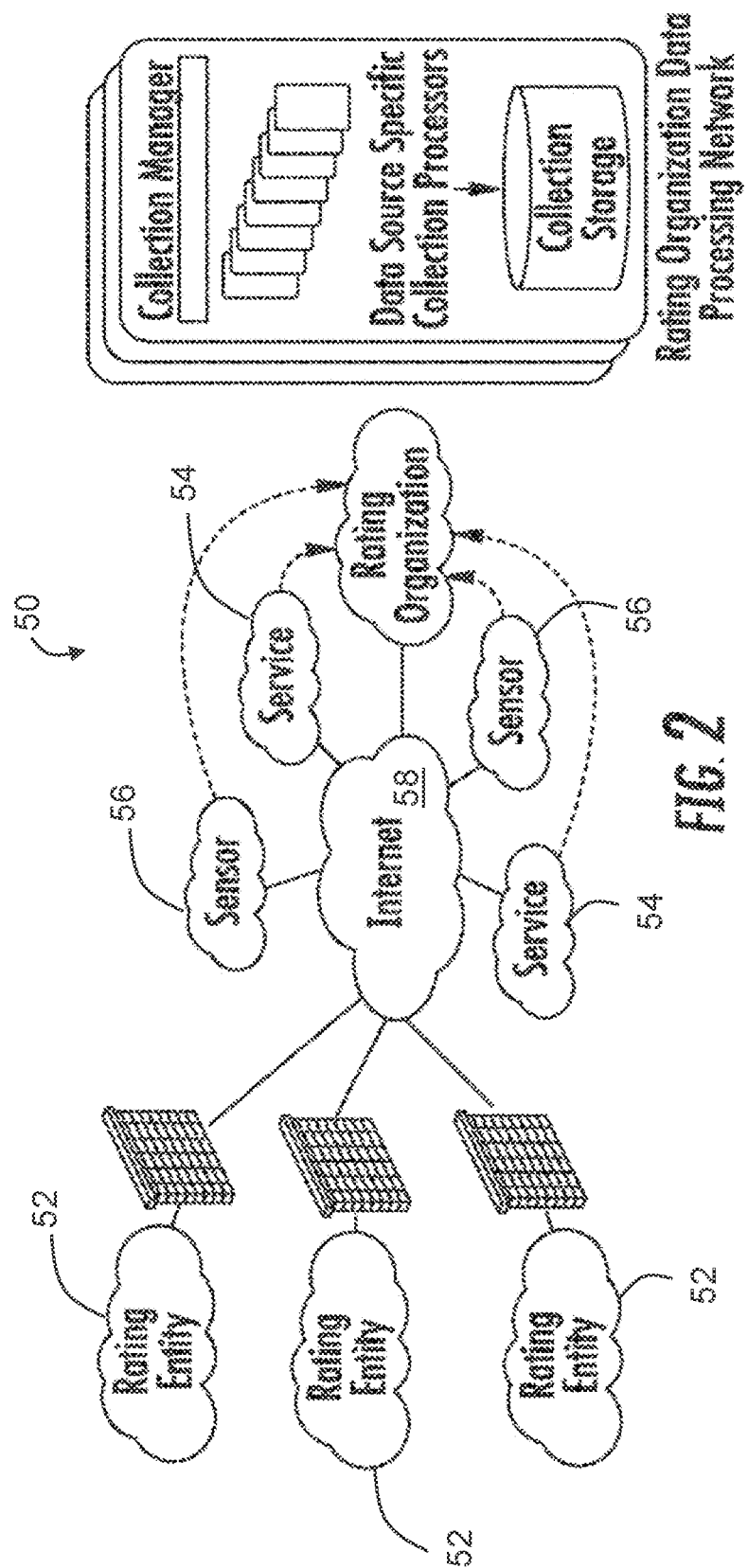
FIG. 2 is a schematic of a system for gathering security data from external sensors.

A collection processing infrastructure 50, configured to build and validate composite security ratings, is shown in FIG. 2. A plurality of different clouds represents different network segments. Rated Entity clouds 52 are organizations for which the system 10 generates a rating. Those entities include an entity perimeter or boundary, indicated by the firewall that connects to the Internet. Services clouds 54 provide data or reports on observed activity from a rated entity 52. An example of a report from a Service 54 could be a list of hosts that have been participating in malicious activity. Services use Sensor networks 56 to observe the behavior of entities. For example, a sensor could observe SPAM messages sent from a rated entity network 52 to the Internet 58.

Entity Mapping

There is no single central repository that holds information about the IP address allocation. Determining the correct and complete IP address space owned by a given entity improves the reliability and robustness of a rating.

In general, Regional Internet Registries (RIRs) manage the allocation and registration of Internet number resources (IP Addresses, Autonomous System Numbers, etc.) within a particular region of the world. There are five RIRs—ARIN for North America, AfriNIC for Africa, APNIC for Asia Pacific, RIPE for Europe, Middle East, Central Asia, and LACNIC for Latin America.

The RIRs allocate the address space to service providers, corporations, universities, etc. The RIRs provide various interfaces that enable queries of the RIR to determine who owns a given IP address. It is also possible to query the database by an entity name and get a list of IP addresses allocated to that entity. Despite lack of standardization of entity names in the RIR databases, well chosen queries can result in a very high coverage of addresses owned by an entity.

Another problem is that RIRs often allocate large chunks of addresses to Internet Service Providers (ISPs) who go on to allocate smaller address spaces to their customers. ISPs are under no obligation to report this data back to anyone. Most small companies contract with their local ISP for Internet access and don't obtain addresses from RIRs.

These problems are addressed by the entity ownership collection system 14 being configured to execute various heuristic processes including the following non-limiting list of examples:

1. Using the 'dig' (http://linux.die.net/man/1/dig) tool to determine any IP information published by an entity. The dig tool takes the domain name of the entity as an argument. For example, execution of 'dig a.com ANY' returns all IP information published by the entity a.com.
2. Use the IP addresses and domain names published to find ranges of IP addresses actually used. ISPs almost always allocate addresses in size of powers of 2 (2, 4, 8 etc.). Knowing one IP address allows probing around that space. The 'whois' (http://linux.die.net/man/1/whois) tool can be used to determine ownership of neighborhood addresses.
3. Even if the entity does not publish any IP information that can be retrieved through dig, most entities have servers whose names may be guessed. Mail servers for the domain a.com often have the name mail.a.com, SMTP servers tend to be smtp.a.com, FTP servers tend to be ftp.a.com etc. Using a tool like nslookup, the entity ownership collection system 14 can verify if any of these common names are in use by the entity.
4. If an IP address is found, the system 14 is configured to probe around the address (such as in step 2) to determine any addresses in the neighborhood owned by that entity.
5. Searching around the website of the company often gives a hint of other servers hosted by the company (ex: reports.a.com) which can be used as a starting point for search.

Rating Methodology

Organizational security risk may be measured along two vectors: vulnerability and resilience. An entity's vulnerability is defined as its "physical, technical, organizational, and cultural states," which can be exploited to create a security breach. An entity's resilience is defined to be its ability to recover from a security breach.

The system 10 uses the concepts of vulnerability and resilience by examining externally observable proxies for them. An example proxy for entity vulnerability is the number of entity-owned IP addresses, which are reported to be malicious. The higher the number of reports the more likely the entity was vulnerable and had been compromised. Resilience is inversely proportional to the duration of detected malicious activity. The shorter the duration of the malicious activity, the higher level of resilience the entity demonstrates as it can quickly identify and remove malicious infections.

To compute the ratings for an entity, the system 10 aggregates all of the data collected pertaining to the IT assets owned by that organization, such as the IP addresses controlled by the entity and the associated activity of those IP addresses. The types of activities depend on the types of data. The data sources may include false positives and the system 10 is configured to account for those uncertainties.

To determine quality metrics for IP address based assets, every IP address is uniquely mapped to an entity. Processing the data from a data source yields a list of IPs for each organization that has demonstrated suspicious or malicious behavior. The processing steps are as follows:

1. For each IP address, determine a security quality metric called "badness".
2. Badness is a number between 0 and 1 that corresponds to the extent and duration of malicious activity that was reported.
3. For each data source in which the IP address is reported, determine a data source specific badness score for that IP.
4. Consolidate the badness score for a given IP across all data sources by cross validating data to determine the aggregate Badness for that IP.
5. Aggregate the badness scores of IPs from an entity to determine the entity's IP asset based security quality metric.

The ratings processing system 30 is configured to account for differences in data sources and types. Given each data source's potentially unique view of an entity, there is not a universal technique that treated them all the same way. Data source specific modeling techniques, for example, were developed for 11 of the 97 data sources in experimental trials in order to demonstrate feasibility and validate the approach. The data sources incorporated accounted for five different data source types: Block Lists, Suspicious Activity, Malicious Servers, Compromised Hosts, and Spamming.

The following two sections give detailed examples of modeling techniques developed for calculating IP address badness for two different data sources that are representative of the data collected.

One of the data sources is a daily updated list of IP addresses that were reported by volunteer hosts from across the Internet. IP Addresses are reported in this data source if they have communicated with hosts that do not expect any inbound communication from them. It lists many more IP addresses on a given day compared with the other data sources and therefore, provides a significant amount of information contained only in this data source. However, this data source has a high incidence of false positives, where a false positive is an unwarranted report due to an incorrectly configured reporting host (i.e., the target) or a listing of an incorrect IP address due to backscatter.

False positives are accounted for by identifying events—where an event is defined as persistent, reported activity on a single IP address within a time period. For each event, heuristics are applied to determine the average intensity for the event. The intensity of an IP address on a given day is a measure of the confidence that malicious activity originated from the IP address on that day.

For the case where an event spans multiple days, the IP address is generally reported on each day in the event. However, if an IP address is listed on one day but not the next, this omission does not necessarily signify that the host has stopped its malicious behavior; rather, it could be that the host was offline for the day. For example, many corporate hosts are offline for weekends and holidays. Thus, an event is allowed to have short inactive periods, or days without any reports on the IP address. To generate the IP address quality metric, a maximum inactive period of three days is used.

The intensity of an IP address for a given day is calculated dynamically and increases both with the number of reporting targets as well as the duration of the event. Reports with a larger number of targets have larger intensities. This is because false positives due to mis-configured hosts are less likely to have occurred when multiple targets report the same IP address on the same day. Likewise, reports that belong to a persistent event have larger intensities, since persistent reports also signal the legitimacy of the malicious activity on the IP address.

The intensity, I(s) is calculated as follows:

$$I(s) = \begin{cases} 0.1, & \text{if } s < 2 \\ 0.01 e^{\frac{\ln(10)(s-1)}{4}}, & \text{if } 2 \leq s < 5 \\ 0.8 - 0.7 e^{-\frac{\ln(10)(s-5)}{4}}, & \text{if } s \leq 5 \end{cases}$$

where s is the number of hosts reporting the IP address. Thus, the average intensity, $I_{avg}$, of an event is the average of the intensities calculated per active day (a day with reports) and is determined as follows:

$$I_{avg} = \frac{I(s)}{T} + \frac{A \cdot I_{prev}}{T},$$

where T is the list time, A is T minus the number of days since the last update, and $I_{prev}$ is the average intensity at the last update. The Badness, $B_{IP}$, of an IP address is derived from the intensity and duration of the events for the IP, such that recent events are weighted heavier than historical events and is calculated as follows:

$$B_{IP} = \min\left(1, \frac{I_{avg}(1 - e^{-0.02})}{1 - e^{-0.12}} \sum_{t_1}^{t_n} e^{-0.02}\right),$$

where $t_l$ and $t_n$ denote time lapsed from the end and beginning of an event, respectively; and the average intensity is readjusted if the persistence surpasses a threshold.

The second data source example is a host block list that lists IP addresses that have been compromised. Based on an analysis of the data sources collection methods, the block list is considered very reliable in the sense that a listing implies that malicious activity originated from the listed address. This block list removes IP addresses from the list if no malicious activity is detected for a small window of time. Because of the high confidence in the data source's accuracy, any IP address on the block list is assigned a raw Badness of 0.8.

Once an IP address is delisted and is no longer on the block list, its Badness decays exponentially with respect to the time since it was last listed. Thus, the Badness is:

$$B_{IP} = 0.8 e^{-\frac{\ln(2)T}{182.625}},$$

where T is the time in days since the last listing. This decay rate corresponds to a half-life of six months.

Various other data sources are handled similarly but the raw score is based on the confidence in the data source's collection methods. Other data sources track CIDR blocks as opposed to individual IP addresses, and so the Badness assigned to a listing on these lists are weighted by the CIDR block size as follows:

$$B_{IP} = 0.8 W e^{-\frac{\ln(2)T}{182.625}},$$

where W is the natural log of the block size.

The total IP space badness of an entity is an aggregation of the badness of the entity's individual IP addresses and/or CIDR blocks. In the simplest model where all data sources are IP address based, the entity badness is the total badness of the IP addresses owned by the entity. To normalize ratings across entities of different sizes, the entity's network size defined as the number of active IP addresses owned by the entity is used:

$$B_{entity} = \frac{\sum_{IP \in entity} B_{IP}}{\ln(N)},$$

where N denotes the network size. Normalizing avoids penalizing of smaller entities allowing fair comparisons between entities of differing sizes.

Enhancements to the Ratings Methodology

The system 10 may also include expanded the methodology to support additional and different types of data sources. It could identify data sources that indicate different levels of IT sophistication—such information is a measure of the level of IT practice maturity.

Entity normalization methods can also account for differences in entity size beyond network size. For example, the use of other normalization methods such as number of employees may help produce more robust normalizations under certain circumstances.

Also, statistical properties of the model's internal parameters may be analyzed and adjust based on the findings. For example, certain inputs or features may be disproportionately skewing the ratings and such inputs or features may be modulated through weighting factors.

The composite security rating described above measured, amongst other things, how much, to what extent, and how recently malicious activity was detected on an entity's cumulative IP space. The score could also be adapted to show a level of confidence. For example, a failure to detect malicious activity on an entity's IP space does not necessarily imply non-malicious behavior. Rather, the data sources may lack coverage on the entity's IP space. By outputting a range as opposed to a number, the system 10 is able to convey its confidence in a rating where a larger range necessarily implies a lower confidence, and a smaller range necessarily implies a higher confidence.

Such a range could be computed from a mean score and a confidence range, which could be determined from a developed discrete choice model. Features such as the Badness scores from each data source could help determine the mean score. Features such as redundancy between data sources and network size could also help determine the confidence range.

Entity mapping may also be improved through other data sources and functions. Data sharing relationships with Internet Service Providers might provide additional data on security outcomes and practices at entity computer systems. Also, consumers of the scoring reports may already have partner-mapping data through the nature of their relationship with the entity or may be able to request the information.

Entity mapping may also be facilitated by persistent updates of the heuristics, such as updating prefixes from BGP announcements and data from Regional Internet Registries.

Data storage used by the system 10 may be improved to minimize the disk space required while supporting rapid inclusion of new entity ratings. For example, high-speed data access layers may be created for daily ratings computation.

Speed and scale can be accomplished through distributed or parallel processing on different systems. A distributed data source query interface may be implemented so that massive and expensive centralized data storage is not required.

The system 10 may also be configured to develop and evaluate predictive capabilities of information security ratings and incorporate them into the rating methodology.

The ability to demonstrate predictability has a dependency on data reliability. For example, improving coverage of malicious events improves data reliability. Statistical evaluations may be used to disambiguate strong entity performance (e.g., no malicious activity) from low coverage (e.g., lack of information on the malicious activity). These evaluations can then be used in the rating methodology.

Statistical evaluations of data coverage may include a data accuracy assessment wherein levels of coverage assurance associated with a particular adopted data source are determined. Also, observations across data sources may be compared to determine data sources of high probability or low probability of coverage for a given entity.

Predictive modeling may include determination of entity historical trends to display and predict future performance. Regression and machine learning based models may be developed to predict information security performance. Models may be evaluated and further developed for predictive capability through a series of prediction experiments.

Also, the data source features may be analyzed for correlations of high and low performance. For example, entities with behavior "X" tend to perform well and entities that demonstrate property "Y" tend to behave poorly.

Use of External and Internal Security Data

Figure 3:
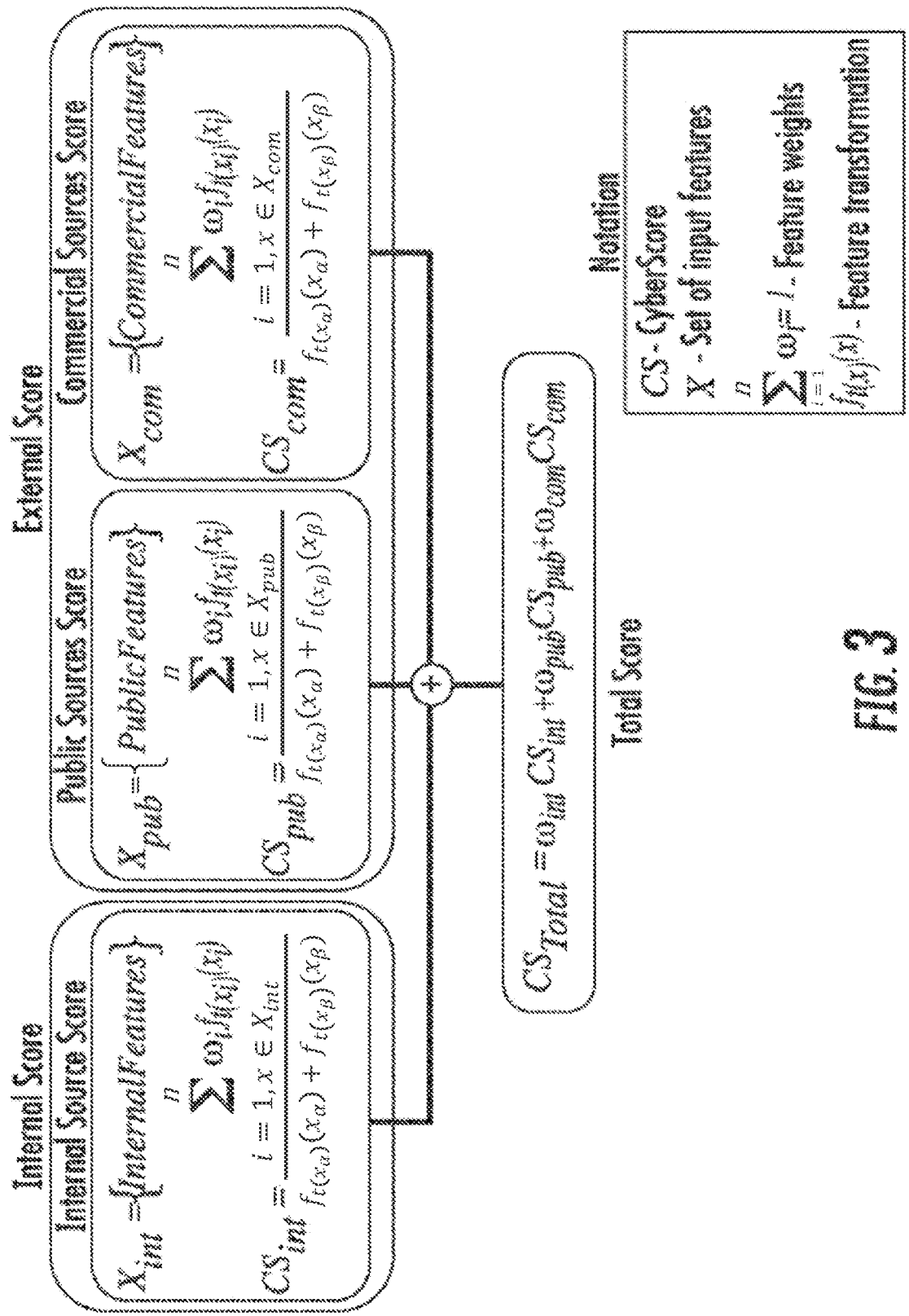
FIG. 3 is a schematic of a composite security rating calculation.

The system 10 may also include internally derived security assessments. For example, such a score computation is shown in FIG. 3. The final score $S_{Total}$ has two components, the Internal score and the External score.

The Internal score, $S_{int}$, is derived from data collected and observed from inside the enterprise. Data sources that provide inputs to the internal scoring function could include, but are not limited to, the following:
  Vulnerability scans
  Firewall Rules
  Incident Reports
  Configurations
  Software inventory
  Policies
  Controls
  User Behavior The features from each of the data sources are extracted to create a feature vector. This feature vector is $X_{int}$={InternalFeatures} in the "Internal Source Score," as shown in FIG. 3. Features include, but are not limited to, derived metrics from the data sources (e.g., the number of remotely exploitable vulnerabilities from outside the entity, the number of incidents, or the number of vulnerable versions of software).

Each feature $x_i$ in $X_{INT}$ has a corresponding transformation function $f_{t(x_i)}(x_i)$ that performs a normalization transformation such that the resultants can be summed.

Each feature $x_i$ in $X_{INT}$ also has corresponding weight $\omega_i$ such that different weights can be placed on the resultant feature transformation where the sum of the weights equal is unity $$\sum_{i=1}^{n} \omega_i = 1.$$

The sum of the transformed and weighted feature vector is computed by summing each resultant for each of the features $$\sum_{i=1, x \in X_{int}}^{n} \omega_i f_{t(x_i)}(x_i).$$

The final score $S_{int}$ is the summation normalized by a set of normalization factors given as $f_t(x_\alpha)(x_\alpha)+f_t(x_\beta)(x_\beta)$ where each normalization factor $x_\alpha, x_\beta, \ldots$ also has a factor normalization transformation function.

The computation of the Internal Score is given as:

$$S_{int} = \frac{\sum_{i=1, x \in X_{int}}^{n} \omega_i f_{t(x_i)}(x_i)}{f_{t(x_\alpha)}(x_\alpha) + f_{t(x_\beta)}(x_\beta)}$$

The External Score is the combination of the Public Sources Score ($S_{pub}$) and the Commercial Sources ($S_{com}$). $S_{pub}$ and $S_{com}$ are derived using the same heuristic combinatorial functions as the Internal Score. However, the input data sources, weights, transformation functions and normalization factors are different.

$S_{pub}$ and $S_{com}$ have their own feature vectors $X_{pub}$={PublicFeatures} and
$X_{com}$={CommercialFeatures} based on the data input sources used.

Data sources in $X_{pub}$ that provide inputs to the $S_{pub}$ score could include but are not limited to the following:
  Industry reports
  Internet monitoring web sites that publish reports (ex: www.malwareurl.com)
  News articles
  Court records Data sources in $X_{com}$ that provide inputs to the $S_{com}$ score could include but are not limited to the following:
  Company proprietary data collected during operations
  Renesys
  Arbor Networks
  Business intelligence bought from corporations and services
  User Behavior With the Internal and External Scores computed, the final total score is computed and the weighted sum of the three:
$S_{Total} = \omega_{int} S_{int} + \omega_{pub} S_{pub} + \omega_{com} S_{com}$ It is possible that the algorithm does not have the same inputs for all entities. More information may be available for some entities compared to other entities. Given this, each data source is assigned a normalized confidence level based on how much they contribute to the computation of the enterprise score. Depending on the actual data that went into rating the company, the confidence level is assigned as a sum of the confidence levels associated with the data sources. The confidence level can be used to assign a range of scores for an enterprise. For instance, if an enterprise is rated as 750 with a confidence level of 0.8, the entity's actual score is reported as (750−(1−0.8)*100, 750)=(730−750). An entity's score is deemed to be unavailable if the confidence level is below a minimum threshold of 0.5.

It should be noted that the $S_{int}$ may be zero due to a lack of available information or permission, wherein $S_{total}$ becomes characteristic only of externally observable characteristics. Also, characteristics for the calculation can be used in conjunction, or vice versa, with functions and aspects of the remaining systems described hereinabove and below.

Distributed System

Figure 4:
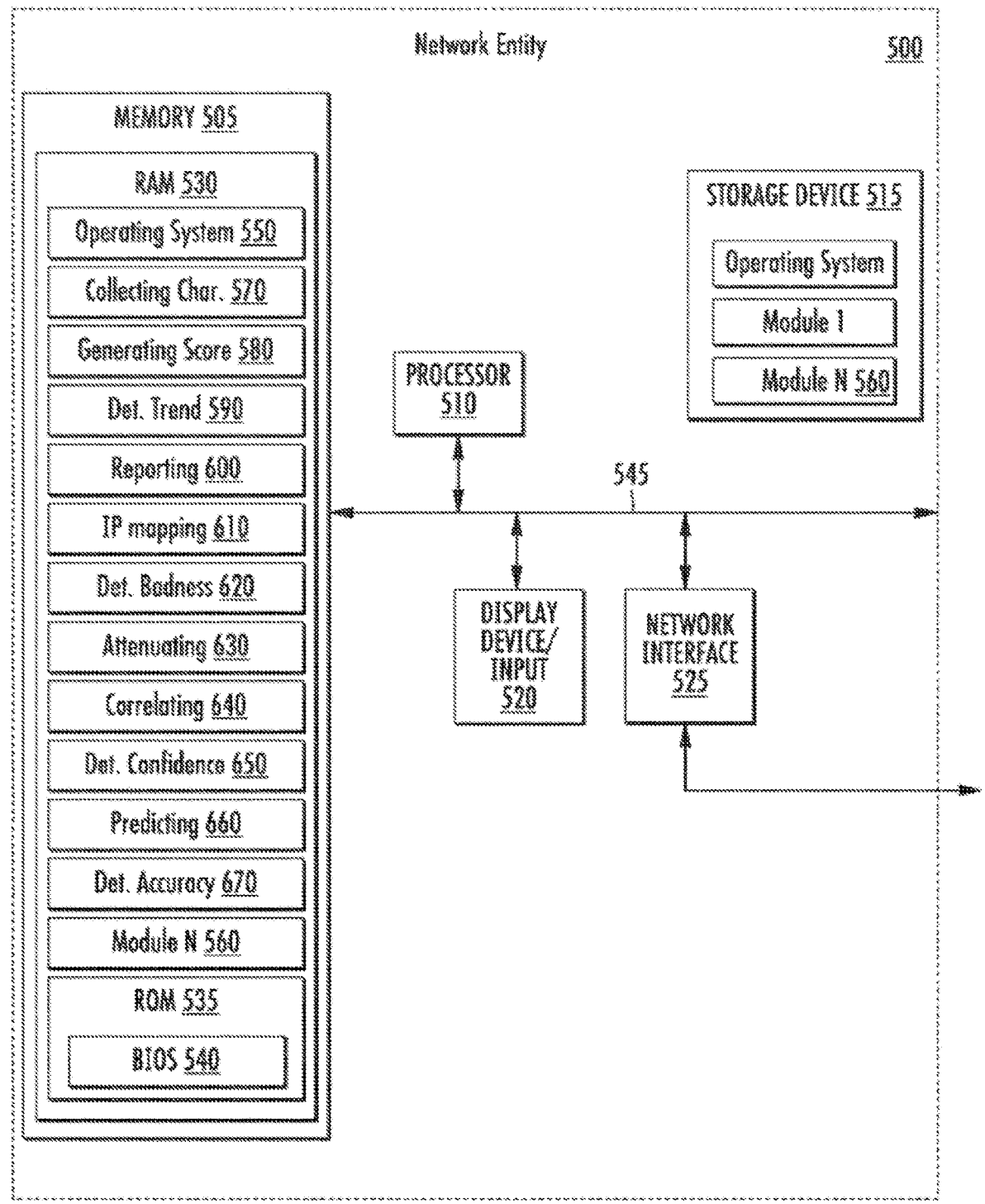
FIG. 4 is a schematic of a distributed system for evaluating information security.

Referring now to FIG. 4, a schematic diagram of a central server 500, or similar network entity, configured to implement a system for creating a composite security score is provided. As used herein, the designation "central" merely serves to describe the common functionality the server provides for multiple clients or other computing devices and does not require or infer any centralized positioning of the server relative to other computing devices. As may be understood from FIG. 4, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above and illustrated by the figures and other materials disclosed herein, such as collecting security characterizations 570, generating a composite rating 580, determining a trend 590, reporting the ratings 600, IP mapping 610, determining a badness quality metric 620, attenuating a raw score 630, correlating with statistical outcomes 640, determining a confidence range 650, predicting future performance 660 and determining an accuracy 670.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining a security rating of an entity, the method comprising:
   determining an internal security rating comprising:
      obtaining data indicative of internal security from a plurality of internal data sources;
      extracting a plurality of internal security features from the obtained data;
      applying a respective transformation function to each of the plurality of internal security features to determine a first plurality of transformed features; and
      combining the first plurality of transformed features to form the internal security rating;
   determining an external security rating comprising:
      obtaining data indicative of external security from a plurality of external data sources;
      extracting a plurality of external security features from the obtained data;
      applying a respective transformation function to each of the plurality of external security features to determine a second plurality of transformed features; and
      combining the second plurality of transformed features to form the external security rating; and
   providing, via a reporting facility, a composite security rating for the entity based on the internal security rating and the external security rating, wherein at least one of the internal security features or the external security features indicates malicious activity associated with an IP address of the entity.

2. The method of claim 1, further comprising:
determining the composite security rating based on a weighted combination of the internal security rating and the external security rating.

3. The method of claim 1, wherein the plurality of internal data sources comprises:
vulnerability scan data of the entity;
data indicating firewall rules of the entity;
data from security incident reports corresponding to the entity;
data indicative of computer network configurations of the entity;
data indicative of software inventory of the entity;
data indicative of security policies of the entity;
data indicative of security controls of the entity; and
data indicative of user behavior corresponding to the entity.

4. The method of claim 1, wherein at least one of the internal security features or the external security features comprise at least one of:
a number of remotely exploitable vulnerabilities of the entity;
a number of security incidents; or
a number of vulnerable versions of software of the entity.

5. The method of claim 1, wherein each respective transformation function is a normalization of the respective feature, and further comprising:
when the normalization is applied to two or more of the internal security features or the external security features, summing the normalized features.

6. The method of claim 1, wherein determining the internal security rating further comprises weighting the first plurality of transformed features.

7. The method of claim 1, wherein combining the first plurality of transformed features comprises:
summing the first plurality of transformed features; and
normalizing the summed features by a set of normalization factors.

8. The method of claim 1, wherein combining the second plurality of transformed features comprises:
summing the second plurality of transformed features; and
normalizing the summed features by a set of normalization factors.

9. A system for determining a security rating of an entity, the system comprising:
one or more computer systems programmed to perform operations comprising:
determining an internal security rating comprising:
obtaining data indicative of internal security from a plurality of internal data sources;
extracting a plurality of internal security features from the obtained data;
applying a transformation function to each of the plurality of internal security features; and
combining the transformed features to form the internal security rating;
determining an external security rating comprising:
obtaining data indicative of external security from a plurality of external data sources;
extracting a plurality of external security features from the obtained data;
applying a transformation function to each of the plurality of external security features; and
combining the transformed features to form the external security rating; and
providing, via a reporting facility, a composite security rating for the entity based on the internal security rating and the external security rating, wherein at least one of the internal security features or the external security features indicates malicious activity associated with an IP address of the entity.

10. The system of claim 9, wherein the one or more computer systems are further programmed to perform operations comprising:
determining the composite security rating based on a weighted combination of the internal security rating and the external security rating.

11. The system of claim 9, wherein the plurality of internal data sources comprises:
vulnerability scan data of the entity;
data indicating firewall rules of the entity;
data from security incident reports corresponding to the entity;
data indicative of computer network configurations of the entity;
data indicative of software inventory of the entity;
data indicative of security policies of the entity;
data indicative of security controls of the entity; and
data indicative of user behavior corresponding to the entity.

12. The system of claim 9, wherein the internal security features and the external security features comprise at least one of:
a number of remotely exploitable vulnerabilities of the entity;
a number of security incidents; or
a number of vulnerable versions of software of the entity.

13. The system of claim 9, wherein each respective transformation function is a normalization of the respective feature, and wherein the one or more computer systems are further programmed to perform operations comprising:
when the normalization is applied to two or more of the internal security features or the external security features, summing the normalized features.

14. The system of claim 9, wherein determining the internal security rating further comprises weighting the first plurality of transformed features.

15. The system of claim 1, wherein combining the first plurality of transformed features further comprises:
summing the first plurality of transformed features; and
normalizing the summed features by a set of normalization factors.

16. The system of claim 9, wherein combining the second plurality of transformed features further comprises:
summing the second plurality of transformed features; and
normalizing the summed features by a set of normalization factors.

* * * * *